(12) United States Patent
Koike et al.

(10) Patent No.: US 8,572,939 B2
(45) Date of Patent: Nov. 5, 2013

(54) WORKING VEHICLE

(75) Inventors: Kazuo Koike, Kobe (JP); Hirokazu Ito, Izumisano (JP)

(73) Assignee: Kubota Corporation, Osaka (JP)

( * ) Notice: Subject to any disclaimer, the term of this patent is extended or adjusted under 35 U.S.C. 154(b) by 35 days.

(21) Appl. No.: 13/241,981

(22) Filed: Sep. 23, 2011

(65) Prior Publication Data
US 2012/0227368 A1 Sep. 13, 2012

(30) Foreign Application Priority Data

Mar. 9, 2011 (JP) .................................. 2011-52004

(51) Int. Cl.
*A01D 34/00* (2006.01)

(52) U.S. Cl.
USPC .................................... 56/10.2 A; 56/10.2 R

(58) Field of Classification Search
USPC .......... 56/10.2 R, 10.3, 10.5, 10.8, 11.1, 11.9
See application file for complete search history.

(56) References Cited

U.S. PATENT DOCUMENTS

| | | | | |
|---|---|---|---|---|
| 5,502,957 | A * | 4/1996 | Robertson | 56/11.9 |
| 5,906,088 | A | 5/1999 | Inui et al. | |
| 5,934,051 | A * | 8/1999 | Hahn | 56/10.2 R |
| 6,892,517 | B2 * | 5/2005 | Adams et al. | 56/10.2 R |
| 7,594,377 | B1 * | 9/2009 | Jansen et al. | 56/10.2 H |
| 2006/0010844 | A1 * | 1/2006 | Angott | 56/7 |
| 2009/0260901 | A1 | 10/2009 | Ishii et al. | |
| 2010/0206647 | A1 | 8/2010 | Ishii et al. | |
| 2011/0259012 | A1 | 10/2011 | Tada et al. | |

FOREIGN PATENT DOCUMENTS

| | | |
|---|---|---|
| JP | 9-201126 | 8/1997 |
| JP | 2003-136970 | 5/2003 |
| JP | 2009-255840 | 11/2009 |
| JP | 2010-184636 | 8/2010 |

OTHER PUBLICATIONS

U.S. Appl. No. 13/046,278 to Akira Minoura et al., which was filed Mar. 11, 2011.
U.S. Appl. No. 13/242,013 to Kazuo Koike et al., which was filed Sep. 23, 2011.
U.S. Appl. No. 13/242,041 to Hiroyuki Tada et al., which was filed Sep. 23, 2011.
U.S. Appl. No. 13/242,079 to Kazuo Koike et al., which was filed Sep. 23, 2011.
U.S. Application No. to Takashi Kuramoto et al., which was filed on.
U.S. Application No. to Takashi Fujii, which was filed on.

(Continued)

*Primary Examiner* — Alicia Torres
(74) *Attorney, Agent, or Firm* — Greenblum & Bernstein, P.L.C.

(57) ABSTRACT

A riding work vehicle that includes a running electric motor unit running and driving a driving wheel unit; a speed setting operation unit operated by a driver to set a target running speed; a working electric motor driving a work device that performs work on a worked object around a vehicle body corresponding to running of the vehicle body; and an exceptional speed controller that performs exceptional speed control to control the running electric motor unit at an exceptional speed lower than the target running speed in a case where load of the working electric motor evaluated by a work load evaluator that evaluates load of the working electric motor is abnormal load higher than a threshold value.

10 Claims, 8 Drawing Sheets

(56) References Cited

OTHER PUBLICATIONS

U.S. Application No. to Akira Minoura et al., which was filed on.

U.S. Application No. to Hiroyuki Tada et al., which was filed on.
U.S. Application No. To Takashi Kuramoto, which was filed on.

* cited by examiner

WORKING VEHICLE

CROSS-REFERENCE TO RELATED APPLICATIONS

The present application claims priority under 35 U.S.C. §119 of Japanese Application No. 2011-052004, filed on Mar. 9, 2011, which is herein expressly incorporated by reference in its entirety.

BACKGROUND OF THE INVENTION

1. Field of the Invention

The present invention relates to a riding work vehicle that includes a vehicle body having a driver's seat; a driving wheel unit supporting the vehicle body; a running electric motor unit running and driving the driving wheel unit; a speed setting operation unit operated by a driver to set a target running speed of the vehicle body; a running controller controlling the running electric motor based on the target running speed; a work unit having a work device that performs work to a worked object around the vehicle body corresponding to running of the vehicle body and a working electric motor that drives the work device; and a work controller controlling the working electric motor.

2. Description of Related Art

One of such riding work vehicles described above is a riding electric mower having a mower unit to mow the lawn as the work unit. Riding electric mowers have a hybrid vehicle type in which an electric motor supplies rotation power to right and left driving rear wheels and supplies rotation power to a mowing blade of the mower unit, and a battery as an electric source of the electric motor is charged by an engine. Riding electric mowers also have an electric vehicle type that has no engine.

The hybrid vehicle type riding electric mower is described in Related Art 1, for example. The riding electric mower described in Related Art 1 has a running electric motor in which right and left driving rear wheels are independently driven and controlled, and smooth turn is achieved by causing the rotation speed of the right and left driving rear wheels to be different from each other. Related Art 1 only describes that the electric motor rotating the mowing blade is controlled by on-off of a mower starting switch provided in the vicinity of the seat, and the mowing blade is not rotated while a driver is not seated in the seat. There is no description of control in which running and mowing are linked. The electric vehicle type riding electric mower is described in Related Art 2. The riding electric mower described in Related Art 2 uses an electric motor as a driving source of right and left rear wheels that are main driving wheels; a running driving source and a steering driving source of right and left front caster wheels; and a driving source of a mowing blade that is a mowing rotation tool constructing a mower. In this riding electric mower, however, there is no detailed description of rotation control of the mowing blade, and there is no description of linking the mowing blade and the running electric motor.

A walking-type battery-powered electric mower operated by a person while walking is designed to efficiently utilize electric power so as to perform mowing work for a long period of time because the battery is small and the capacity is small. In such an electric mower, described in Related Art 3 for example, a battery is connected to a direct-current electric motor in which a mowing edge is attached to an output shaft, and a control unit increasing and decreasing supply current to the electric motor depending on increase and decrease of load is connected between the electric motor and the battery so as to maintain the rotation number of the electric motor to be substantially uniform at a minimum rotation number or a rotation number close to the minimum rotation number which enables normal operation of the mowing edge even at heavy load. This control unit reduces power consumption of the electric motor to be a minimum necessary for mowing at heavy load; reduces power consumption more than necessary by curbing the rise of the rotation number of the electric motor at low load; and reduces change in the power consumption with respect to change in the load. The riding mower, however, performs mowing work while running at a relatively higher speed than a walking speed by using a motor or an engine. In addition, the variable range of the running speed is large and the mowing load as work load significantly changes corresponding to the running speed, which changes the work results. Taking this into consideration, mowing control in the walking-type electric mower cannot be applied without any change.

[Related Art 1] Japanese Patent Laid-Open Publication No. 2009-255840 (paragraphs [0027-0089]; FIG. 3)

[Related Art 2] Japanese Patent Laid-Open Publication No. 2010-184636 (paragraphs [0036-0117]; FIG. 10)

[Related Art 3] Japanese Patent Laid-Open Publication No. H09-201126 (paragraphs [0006-0030]; FIG. 5)

SUMMARY OF THE INVENTION

In view of the above circumstances, an advantage of the present invention is to provide a riding work vehicle that reduces inconveniences caused by change in the work load of the electric work device performing work to a worked object around a vehicle body corresponding to running of the vehicle body.

An aspect of the present invention provides a riding work vehicle that includes a vehicle body having a driver's seat; a driving wheel unit supporting the vehicle body; a running electric motor unit running and driving the driving wheel unit; a speed setting operation unit operated by a driver to set a target running speed of the vehicle body; a running controller controlling the running electric motor based on the target running speed; a work unit having a work device that performs work to a worked object around the vehicle body corresponding to running of the vehicle body and a working electric motor that drives the work device; a work controller controlling the working electric motor; a work load evaluator that evaluates load of the working electric motor; and an exceptional speed controller that performs exceptional speed control to control the running electric motor unit at an exceptional speed lower than the target running speed in a case where the load of the working electric motor evaluated by the work load evaluator is abnormal load higher than a threshold value.

In a case where the work device is driven by an electric motor, the rotation number of the electric motor will be lowered and thus the work performance of the work device will be deteriorated as the work load increases. However, it is difficult for a driver to notice the deteriorated performance unless the structure allows a driver to directly monitor the work device. According to the configuration of the present invention described above, the work load evaluator evaluates load on the working electric motor while running at the target running speed set by the speed setting operation unit, and exceptional speed control is performed so as to control the running electric motor unit at an exceptional speed lower than the target running speed in a case where the load of the evaluated working electric motor is abnormal load higher than a threshold value. With this, the running speed of the riding work vehicle becomes low, the work load of the work device performing work to a worked object around the vehicle body is lowered corresponding to running, and the work performance of the work device is restored.

There are quite a lot of cases where the speed of the vehicle body should be lowered consciously by a driver rather than automatically by the vehicle body. According to one of the preferred embodiments of the present invention, therefore, an alarm is provided to alert occurrence of the above abnormal load to a driver, and the above exceptional speed control is performed when the abnormal load is not solved even when the occurrence of the abnormal load is alerted by the alarm. With this configuration, prior to automatically lowering the speed of the vehicle body so as to avoid deterioration of the work performance of the work device, the necessity is alerted to a driver, and the vehicle body forcibly performs exceptional speed control when the driver continues to drive without becoming aware of the necessity.

The linkage between the operating position of the speed setting operation unit and the speed control amount to the running electric motor unit is blocked by performing the exceptional speed control. In order to restore the linkage, it is necessary to cause a driver to become aware of difference between the current vehicle speed and the operating position of the speed setting operation unit, and the correction thereof. For this purpose, according to one of the preferred embodiments of the present invention, while the exceptional speed control is performed, the target running speed by the speed setting operation unit is canceled until the value of the target running speed by the speed setting operation unit corresponds to the exceptional speed. With this configuration, the running control is returned to a driver only after the driver adjusts the speed setting operation unit to be an operation position corresponding to the exceptional speed that is a current vehicle speed. Consequently, the driver can be aware of difference between the current vehicle speed and the operating position of the speed setting operation unit, and the correction thereof.

The load on the working electric motor is caused by a work amount of the work device to a worked object, and the results of the load on the working electric motor appear in the supply current value to the working electric motor or the rotation number of the working electric motor. Based on the detection amount of those, therefore, it is possible to obtain normal work load, and abnormal load outside the normal work load. The threshold value judging whether the load on the working electric motor is normal or abnormal thus can be a value between the estimated detection amount at the time of the normal work load and the estimated detection amount at the time of the abnormal work load. According to one of the preferred embodiments of the present invention, therefore, the above threshold value is set based on a load evaluation value derived from combination of the work amount to the worked object and the supply current value to the working electric motor or the rotation number of the working electric motor during running work.

In mowing work with a riding electric mower in which lawn is mown by driving a rotation blade while running the vehicle body, for example, when the riding electric mower enters a lawn dense area or an area where lawn is difficult to mow and abnormal load occurs, the rotation number of the rotation blade is lowered, and imperfect mowing or finishing defect occurs. Consequently, it is necessary to move from the abnormal load into the normal load by reducing the running speed. For this purpose, it is advantageous to apply the present invention to a riding electric mower in which the work unit is a mower unit and the worked object is lawn grass.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt made to show structural details of the present invention in more detail than is necessary for the fundamental understanding of the present invention, the description is taken with the drawings making apparent to those skilled in the art how the forms of the present invention may be embodied in practice.

Figure 1:
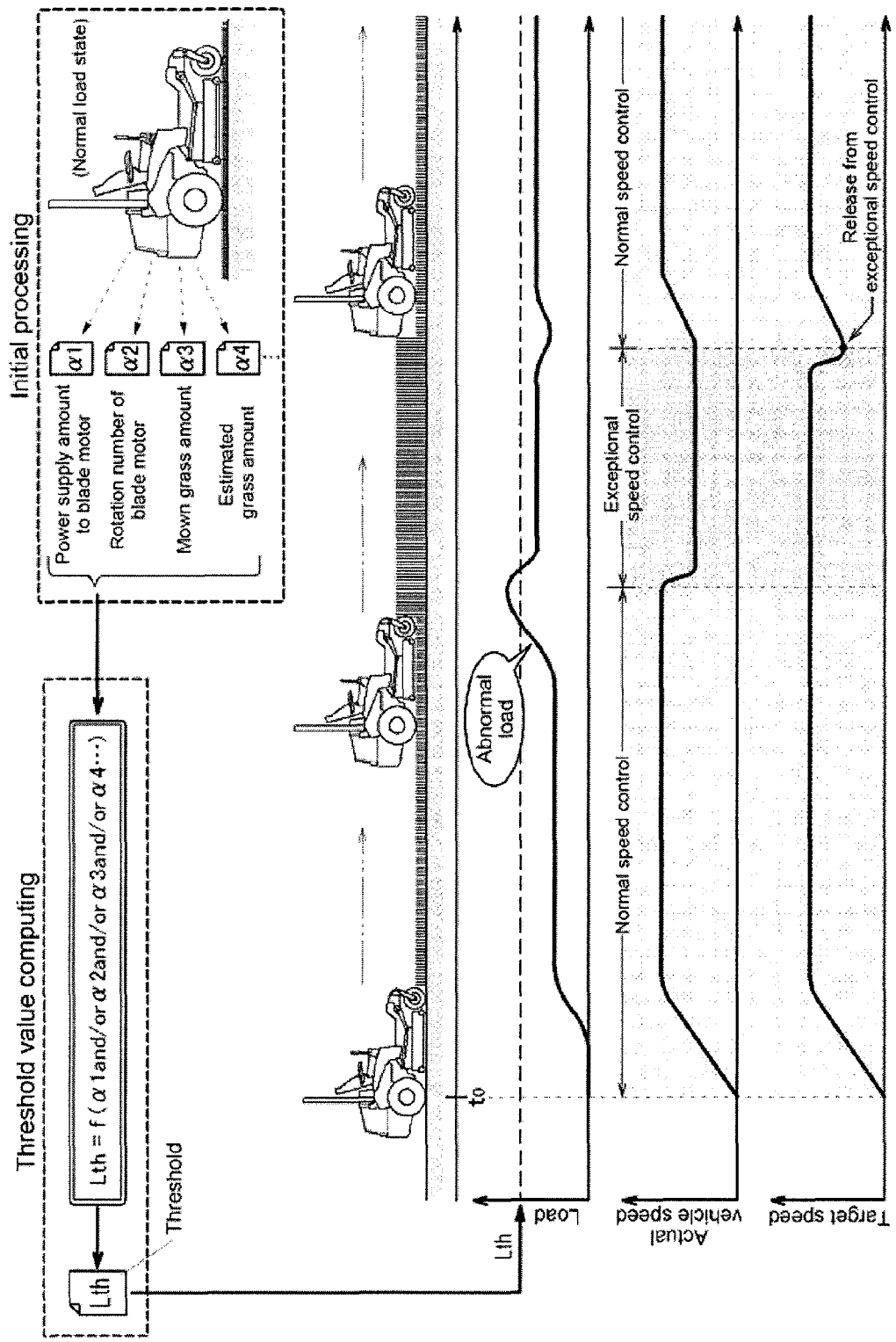
FIG. 1 is a diagram explaining the principle of control according to the present invention in which a vehicle body is caused to run at an exceptional speed lower than a target running speed in a case where excessive load occurs in a work unit.

Embodiments of the present invention will be explained below with reference to the drawings. Prior to explaining the specific configuration of the present invention, an explanation will be made on the basic principle of exceptional speed control that features the present invention with reference to FIG. 1. In the exceptional speed control, when load on the working electric motor of the work unit is evaluated and determined to be abnormal load higher than a predetermined threshold value, the running electric motor unit is controlled at an exceptional speed lower than a target running speed set based on the operating position of a speed setting operation unit at that time. Here, the electric work vehicle is a riding electric mower in which a vehicle body is provided with a mower unit as the work unit, and the working electric motor is a motor (blade motor) for a rotation blade that mows the lawn.

First, prior to mowing work performed by operating the riding electric mower, a threshold value is set as initial processing to determine whether load on the blade motor (running electric motor) of the mower unit (work unit) is abnormal or not (normal). In the mowing work using the mower unit, as the amount of mown lawn discharged from the mower unit becomes large, the rotation number of the blade motor is decreased, and the amount of power supply to the blade motor is increased to maintain the rotation number.

Consequently, the parameters related to the load on the blade motor include (1) the amount of power supply to the blade motor α1; (2) the rotation number of the blade motor α2 (this rotation number is a rotation number per unit time, which means a rotation speed); (3) the amount of mown grass discharged from the mower unit α3 (the amount of lawn grass mown by the rotation blade); (4) the estimated amount α4 of lawn grass entering the mower unit while running α4 (which is similar to (3), and the amount of lawn grass is estimated by providing a contact sensor or an image sensor on the front side of the running direction of the mower unit); and the like.

When the load on the blade motor becomes equal to or greater than a predetermined one, not only the rotation number of the blade motor is lowered, but also inconveniences in the work performance such as imperfect mowing or irregularities of the mown surface occur in the mowing work. Accordingly, in trial work and the like, as the threshold value to determine abnormal load, a threshold value "Lth" may be derived based on at least one of the above physical amounts α1-α4 . . . in a state where predetermined work performance is secured. In this instance, the threshold value can be expressed as Lth=f (α1 and/or α2 and/or α3 and/or α4 . . . ). Incidentally, in a case where an appropriate state cannot be achieved to derive a threshold value, a default threshold value stored in advance such as a threshold value at the time of previous work may be set. A threshold value at the time of previous work is used when the work is performed under the same conditions.

When the initial setting processing such as setting of a threshold value is finished, actual mowing work is started by running in a lawn area while rotating the blade. When the mowing work is started, at least one of the above physical amounts related to the load on the blade motor is detected, and a load evaluation value during work L=f (α1 and/or α2 and/or α3 and/or α4 . . . ) is derived by using the detected amount as an input parameter.

The load evaluation value during work L is compared to a preset threshold value as follows:
(1) In a case where the load evaluation value during work is equal to or less than the threshold value (L≤Lth), it is considered that the blade motor has no load. When exceptional speed control is in operation, it may be possible to encourage a driver to be released from the exceptional speed control. When it is much below the threshold value for a long period of time, it may be possible to employ control in which the exceptional speed control is automatically released by automatically adjusting the running speed to be the target running speed set based on the operating position of the speed setting operation unit, or it may be possible to alert the driver that the work has a capacity.
(2) In a case where the load evaluation value during work is more than the threshold value (L>Lth), it is considered that the blade motor has high load (abnormal load) that produces abnormalities to the work performance, and exceptional speed control is performed so as to forcibly reduce the running speed to the exceptional speed. In this instance, the exceptional speed may be a predetermined running speed, or a running speed lower than the running speed at that time by a predetermined ratio. Since the running speed is forcibly reduced to the exceptional speed, the running speed after the reduction (exceptional speed) and the target running speed set based on the operating position of the speed setting operation unit do not coincide with each other. Prior to moving into the forcible exceptional speed control, it may be possible to alert the driver that the work has high load and encourage the driver to reduce the running speed. Incidentally, it is inconvenient to perform the exceptional speed control by instantaneous load change. Therefore, it is preferable to employ a collateral condition that the comparison result of the load evaluation value L is more than the threshold value for a predetermined period of time, or use an average load evaluation value during work "Lave" instead of the load evaluation value during work L in which the average load evaluation value during work "Lave" is calculated by performing temporal averaging with a method such as moving average with respect to the temporally obtained load evaluation value during work L.

According to one of preferred methods for terminating the exceptional speed control that has been started once, i.e., releasing from the exceptional speed control to the normal speed, the driver operates the speed setting operation unit such that the target running speed is reduced to correspond to the actual running speed. With this, it is possible to make the driver aware that the actual running speed and the target running speed by operation of the speed setting operation unit, and make the driver conscious of occurrence of the abnormal load.

Next, an explanation will be made on a detailed embodiment of the riding work vehicle which employs the above-described basic principle of the exceptional speed control. Here, the riding work vehicle is a riding electric mower in which a vehicle body is provided with a mower unit as the work unit, and the working electric motor is a blade motor for a rotation blade that mows the lawn grass.

Figure 2:
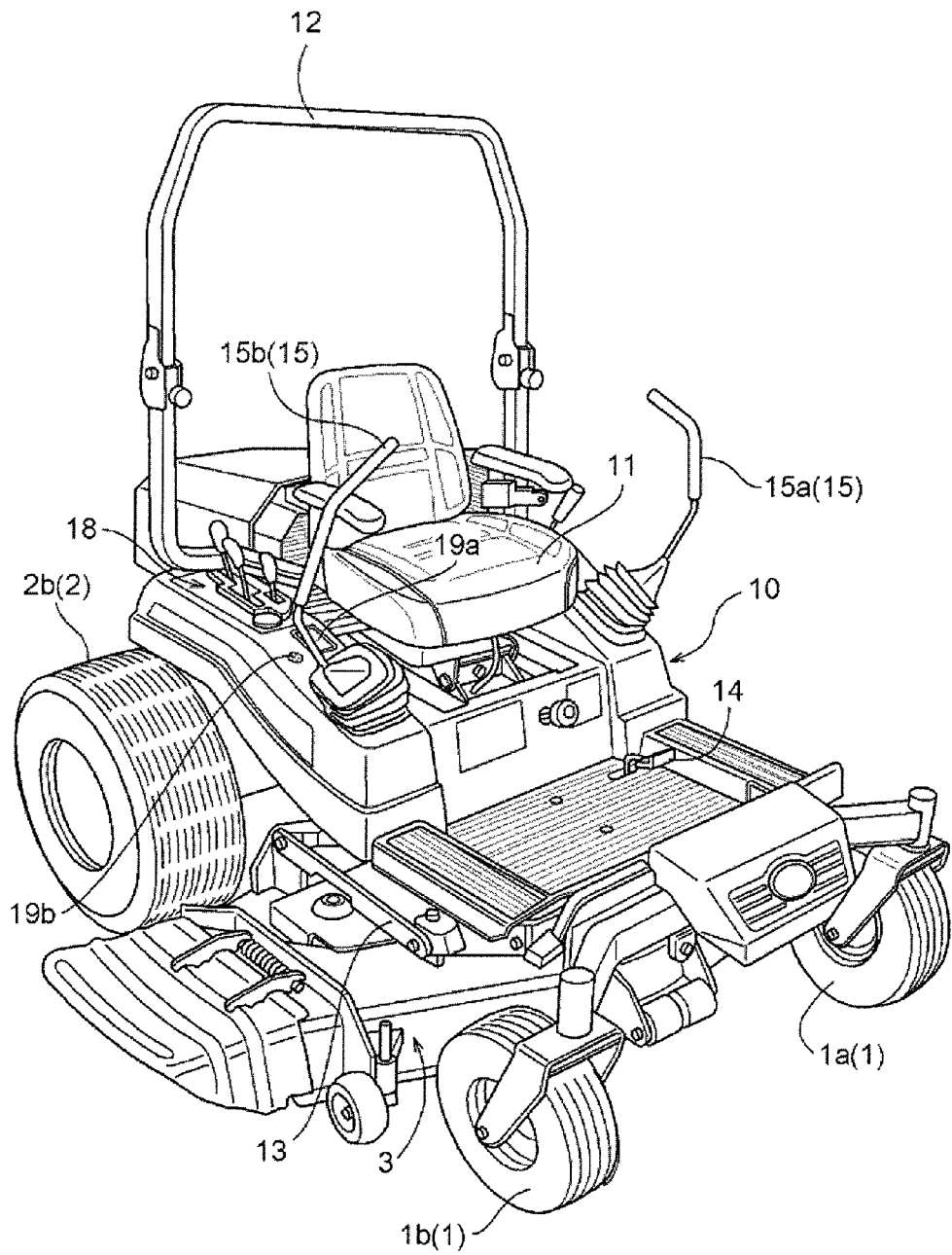
FIG. 2 is a perspective view illustrating an embodiment of a riding electric mower according to the present invention.
Figure 3:
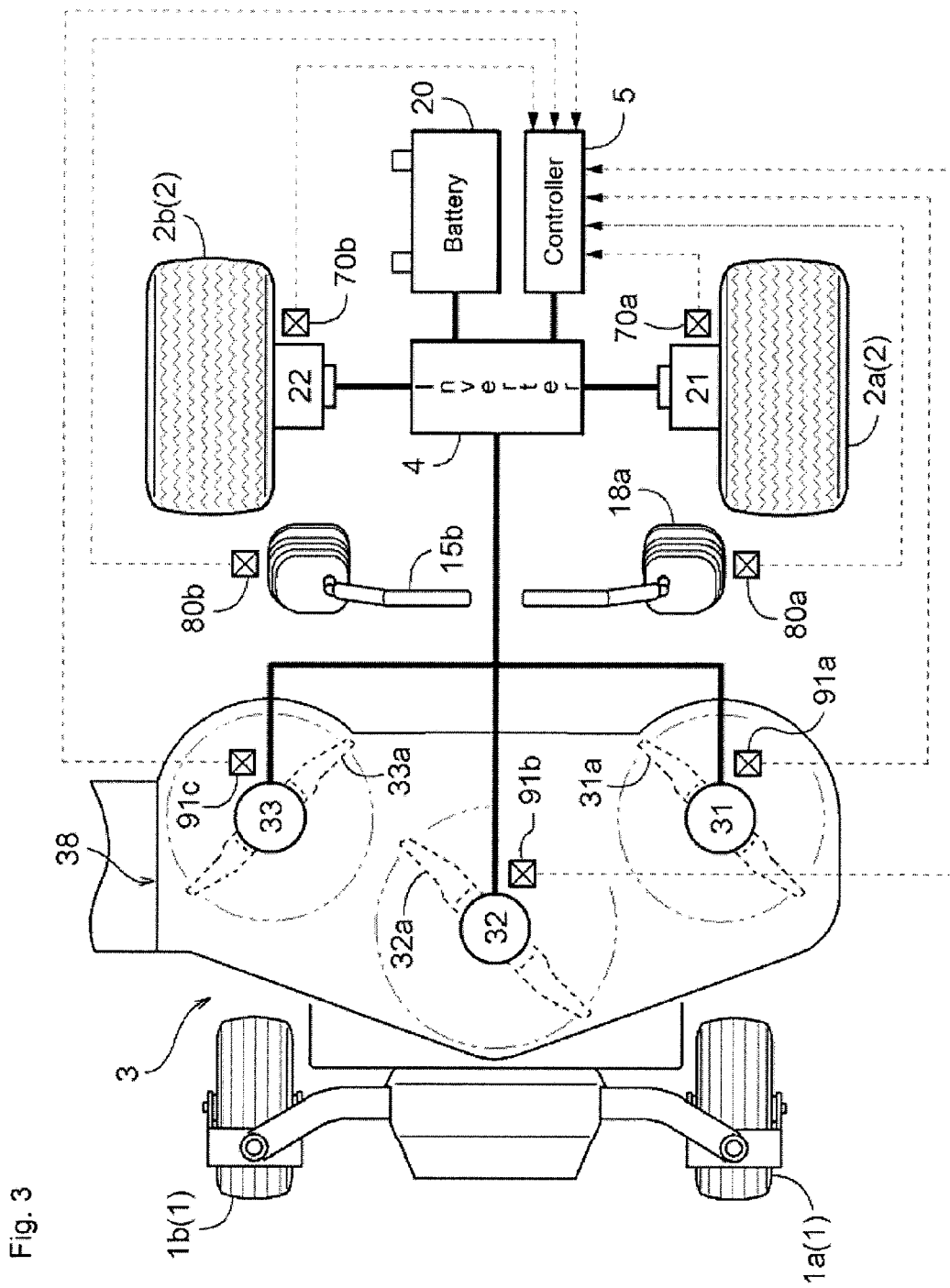
FIG. 3 is a systematic view illustrating an electric system and a power system of the riding electric mower.

The perspective view of such a riding electric mower is illustrated in FIG. 2, and an electric system and a power system of the riding electric mower is schematically illustrated in FIG. 3. The riding electric mower includes a front wheel unit 1 having a pair of right and left free rotating caster-type front wheels 1a and 1b; a rear wheel unit 2 having a pair of right and left driving rear wheels 2a and 2b; a vehicle body 10 supported by the front wheel unit 1 and the rear wheel unit 2; a battery 20 provided in the rear section of the vehicle body 10; a driver's seat 11 provided in front of the battery 20; a rollover protection frame 12 standing from the rear section of the driver's seat 11; a mower unit 3 hanging from the vehicle body 10 to be movable upward and downward by an elevating link mechanism 13 in the lower space of the vehicle body 10 between the front wheel unit 1 and the rear wheel unit 2. Power supply to the rear wheel unit 2 and the mower unit 3 is performed by an inverter 4 that operates based on control by a controller 5 called an ECU.

A floor plate is provided in front of the driver's seat 11 to put the driver's foot thereon, and a brake pedal 14 is projected therefrom. A work unit (speed setting operation unit) 15 is provided on both sides of the driver's seat 11. The work unit 15 has a left steering lever 15a and a right steering lever 15b which swing around the horizontal swing axis in a vehicle body transverse direction. An electric operating panel 18 having an electric control switch button or switch lever is provided on one side of the driver's seat 11, that is, on the left side here.

A left wheel motor 21 and a right wheel motor 22 are installed, which are in-wheel motors rotating and driving the left rear wheel 2a and the right rear wheel 2b, respectively. The rotation speeds of the motors 21 and 22 are changed by the power amount supplied thereto through the inverter 4 independently. Therefore, the rotation speeds of the left rear wheel 2a and the right rear wheel 2b can be differentiated, and the direction of the riding electric mower is changed by the difference in the speed of the right and left rear wheels.

Figure 4:
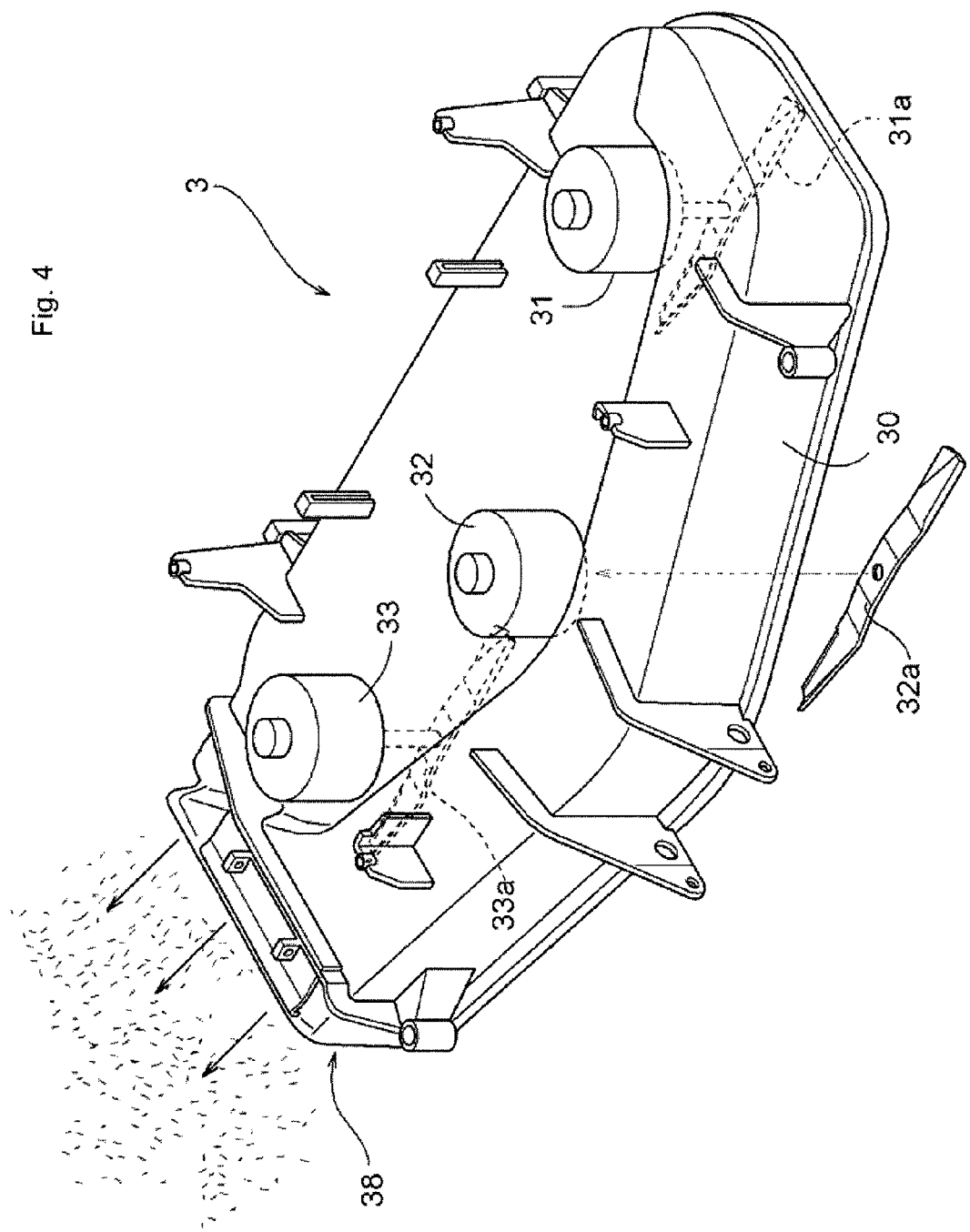
FIG. 4 is a perspective view illustrating an example of a mower unit.

As shown in FIG. 4, the mower unit 3 is a side discharge type having three blades. The mower unit 3 has a mower deck 30 and three rotation blades 31a, 32a, and 33a. The mower unit 3 itself is similar to a conventional one except that the three rotation blades 31a, 32a, and 33a are rotated and driven by blade motors 31, 32, and 33, respectively. On the outer side of the mower unit 3, gauge wheels are provided at four corners, and ground rollers are provided in the front and rear of the center. Baffle plates are provided on the inner side of the mower deck 30 to be on a front side with respect to the rotation blades 31a, 32a, and 33a, and vacuum plates are formed on the inner rear side of the mower deck 30 to be along the rear side of the rotation trajectory that the tip ends of the rotation blades 31a, 32a, and 33a draw. These are not shown in the drawings. A discharge outlet 38 is formed on a right side of the mower deck 30.

The mower deck 30 has a ceiling surface; a front longitudinal wall extending downward from a front edge section of the ceiling surface; a rear longitudinal wall extending downward from a rear edge section of the ceiling surface; and a side longitudinal wall extending downward from a side edge section of the ceiling surface. The three rotation blades 31a, 32a, and 33a are provided in parallel on the inner side of the mower deck 30 in a lateral direction. The three rotation blades 31a, 32a, and 33a are provided to form a triangle in a plan view such that the rotation blade 32a located in the center of the mower deck 30 in the lateral direction is displaced slightly forward. The rotation blade 31a is positioned to be farthest away from the discharge outlet 38 in the most upstream of a grass flowing direction. In this mower unit 3, the rotation blade 33a is positioned closest to the discharge outlet 38 in the most downstream of the grass flowing direction. The blade motors 31a, 32a, and 33a are respectively attached to the drive shafts of the blade motors 31, 32, and 33 fixed to the ceiling surface of the mower deck 30 through brackets which are not shown in the drawings. Incidentally, each of the rotation blades 31a, 32a, and 33a has a cutting edge on the both ends thereof. Further, a wind-creating vane is formed on a rear side of each cutting edge.

In mowing work, mown grass is cut with the rotation blades 31a, 32a, and 33a by running the riding electric mower while rotating the rotation blades 31a, 32a, and 33a, and guided to the vacuum plate and the baffle plate by wind created from the wind-creating vane of the rotation blades 31a, 32a, and 33a, sent to one lateral end side where the discharge outlet 38 is located through the inside of the mower deck 30, and discharged from the discharge outlet to the lateral outside of the mower deck 30.

As described above, each of the blade motors 31, 32, and 33 can independently change the rotation speed by the amount of power supplied through the inverter 4. In this embodiment, however, an explanation will be made on constant-speed control (on-off control) in which the rotation speed is not changed so as to facilitate the control. It is not necessary to make the rotation speeds of the blade motors 31, 32, and 33 identical. The rotation speeds of the blade motors 31, 32, and 33 can be differentiated by making the rotation speed of the blade motor 31 that rotates the rotation blade 31a farthest away from the discharge outlet 38 higher than the rotation speed of the blade motor 33 that rotates the rotation blade 33a closest to the discharge outlet 38, for example. The rotation speed may be selected to be the best taking power saving and discharge/transfer efficiency of mown grass into consideration. For similar purposes, the rotation torque may be made larger in the blade motor closer to the discharge outlet 38 because the blade motor 33 of the rotation blade 33a closest to the discharge outlet 38 discharges mown grass from the other blade motors.

Inverter control is performed by the controller 5 to supply power to the left wheel motor 21 and the right wheel motor 22 for running, and the blade motors 31, 32, and 33 for mowing. The inverter 4 connected to the battery has a blade power supplying section 40 for supplying identical or different power to the blade motors 31, 32, and 33; a left wheel power supplying section 41 for supplying power to the left wheel motor 21; and a right wheel power supplying section 42 for supplying power to the right wheel motor 22.

Figure 5:
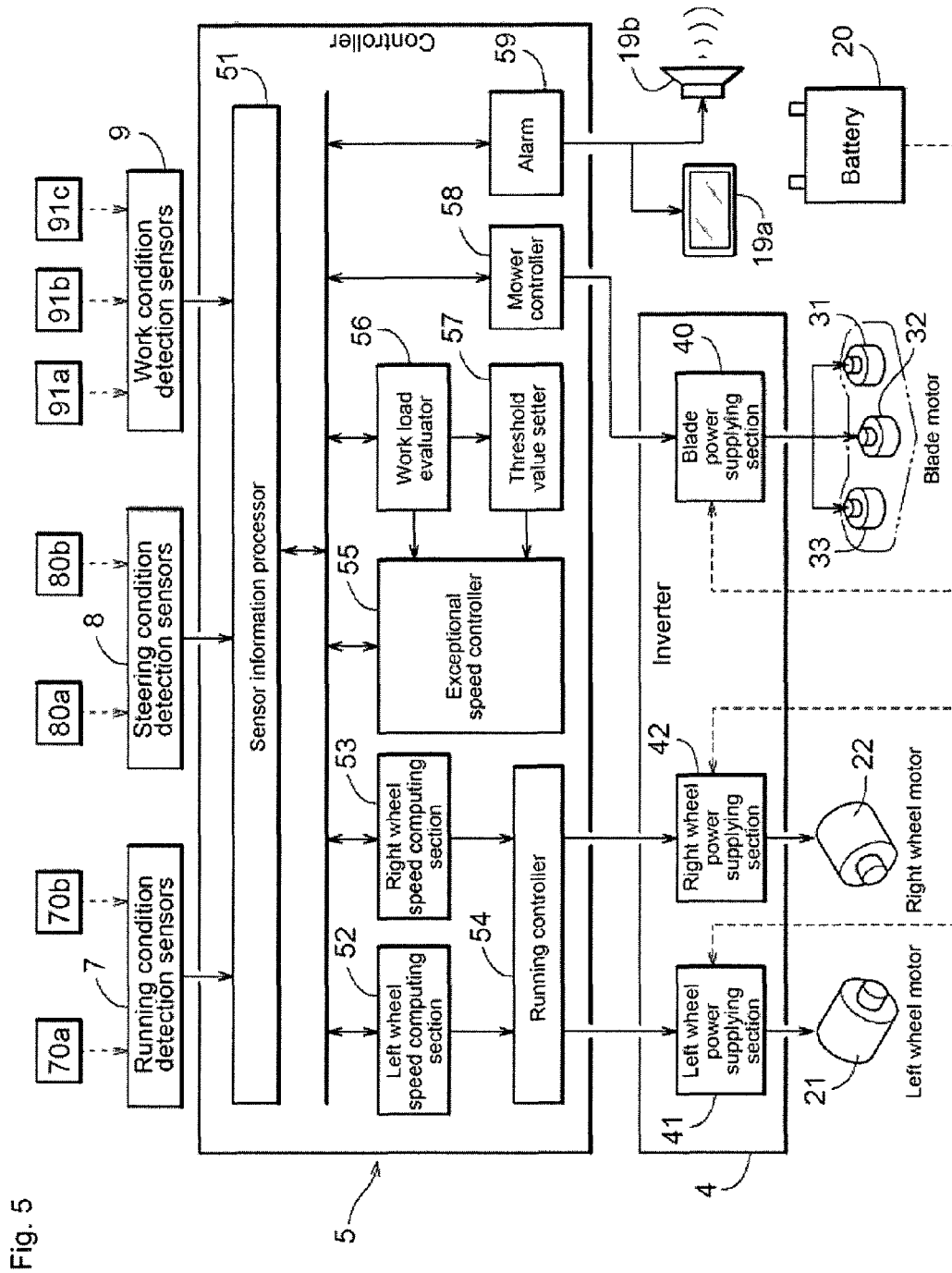
FIG. 5 is a block diagram of functions of a controller.

As shown in FIG. 5, the controller 5 is connected to running condition detection sensors 7, steering condition detection sensors 8, operating condition detection sensors 9, and the inverter 4. The running condition detection sensors 7 include sensors to detect running information such as a left rear wheel rotation detection sensor 70a that detects the rotation number of the left rear wheel 2a and a right rear wheel rotation detection sensor 70b that detects the rotation number of the right rear wheel 2b. The steering condition detection sensors 8 include sensors to detect steering information such as a left steering angle detection sensor 80a that detects the swinging angle of the left steering lever 15a, a right steering angle detection sensor 80b that detects the swinging angle of the right steering lever 15b, and a brake detection sensor that detects the operation angle of the brake pedal 14. The operating condition detection sensors 9 include blade rotation detection sensors 91a, 91b, and 91c that detect the rotation numbers of the blade motors 31, 32, and 33 or an ammeter that detects electric current flowing through the blade motors 31, 32, and 33, or both; a mown grass detection sensor that detects the amount of mown grass discharged from the discharge outlet 38 of the mower deck 30; and a mown grass estimation sensor that estimates the amount of mown lawn entering the mower deck 30 while running. In order to estimate the load of the blade motors 31, 32, and 33, however, one of them is enough. In this embodiment, the operating condition detection sensors 9 include only the rotation detection sensors 91a, 91b, and 91c.

In the controller 5, a sensor information processor 51, a left wheel speed computing section 52, a right wheel speed computing section 53, a running controller 54, an exceptional speed controller 55, an operating load evaluator 56, a threshold value setter 57, a mower controller 58, an alarm 59, and the like are constructed by executing a program. It may be possible to construct them by a hardware if needed. The sensor information processor 51 processes a sensor signal input from the running condition detection sensors 7, the steering condition detection sensors 8, and the operating condition detection sensors 9, and converts the input into usable information inside the controller 5. The alarm 59 generates information to alert a driver. When the information is visual information, the alert is given by using a display panel 19a such as a liquid crystal display as an outputting device. When the information is auditory information, the alert is given by using a speaker 19b.

The left wheel speed computing section 52 calculates the rotation speed (rotation number) of the left rear wheel 2a, i.e., the rotation speed (rotation number) of the left wheel motor 21 based on operation information via the left steering angle detection sensor 80a that detects the operation amount of the left steering lever 15a by a driver. In this instance, a table or function showing the relationship $v=g(p)$ between the operating position p and the rotation speed v is used. In a similar manner, the right wheel speed computing section 53 calculates the rotation speed (rotation number) of the right rear wheel 2b, i.e., the rotation speed (rotation number) of the right wheel motor 22 based on operation information via the right steering angle detection sensor 80b that detects the operation amount of the right steering lever 15b by a driver.

The running controller 54 provides the left wheel power supplying section 41 and the right wheel power supplying section 42 with a control signal to supply to the left wheel motor 21 and the right wheel motor 22 electric power necessary for achieving the rotation speed of the left wheel motor 21 and the rotation speed of the right wheel motor 22 calculated by the left wheel speed computing section 52 and the right wheel speed computing section 53. In this instance, when a slight difference in the target rotation speed between the left wheel motor 21 and the right wheel motor 22 occurs, in order to prevent the vehicle body from swinging to right and left, it is preferable to perform running control to avoid chattering by providing a dead zone, or running control to assume whether a driver intends to run straight or run with a slight turn and generate a control signal based on the assumption.

The operating load evaluator 56 calculates load on the mower unit 3, i.e., a load evaluation value $L=f(\alpha1$ and/or $\alpha2 \ldots)$ showing load on each of the blade motors 31, 32, and 33 from the control input parameter ($\alpha: \alpha1, \alpha2 \ldots$) such as the relationship between the rotation speeds of the blade motors 31, 32, and 33 obtained by the sensor information processor 51 and the control signal given to the blade motors 31, 32, and 33; the amount of cut grass; and the electric current value flowing through the blade motors 31, 32, and 33.

The threshold value setter 57 calculates a reference load evaluation value "Lref" in the blade motors 31, 32, and 33 when mowing work is performed with normal load on the mower unit 3, i.e., mowing work is performed to lawn with an average level density while running at an appropriate running speed. The threshold value setter 57 sets a value to which a predetermined value ΔL is added, for example, as a threshold value (Lth=Lref+ΔL) to determine abnormal load on the mower unit 3 by using the above reference load evaluation value as a reference.

The mower controller 58 rotates the blade motors 31, 32, and 33 at a set speed based on a switch operation and the like by a driver. Basically, the rotation speeds of the blade motors 31, 32, and 33 are synchronized and become identical. In a case where the rotation trajectories do not overlap each other, however, the rotation speeds can be differentiated. In addition, one of the three motors may be stopped corresponding to a required mowing width. A structure is also possible in which the rotation speed of each of the blade motors 31, 32, and 33 can be switched to a plurality of levels of speeds such as a low-speed mode and a high-speed mode even in a case where the rotation speeds of the blade motors 31, 32 and 33 are synchronized at the same speed.

The exceptional speed controller 55 runs the riding mower at an exceptional speed lower than the target running speed determined by the operation amount of the right and left steering levers 15a and 15b, i.e., a speed lower than a speed which a driver intends in a case where abnormal load occurs on the mower unit 3. Occurrence of abnormal load on the mower unit 3 is detected by judging the load evaluation value of the mower unit 3, i.e., the load evaluation value showing load on the blade motors 31, 32, and 33 as abnormal load exceeding the threshold value "Lth" set by the threshold value setter 57. Instead of immediately performing the automatic reduction of the running speed, it may be possible to alert occurrence of abnormal load to a driver and give an opportunity to reduce the running speed by the driver itself. In this case, after occurrence of abnormal load, the alert is given to a driver by the alarm 59. When the abnormal load is not solved in a predetermined period of time, the running speed by the exceptional speed controller 55 is forcibly reduced to the exceptional speed. The exceptional speed may be a fixed value determined in advance, or a speed calculated corresponding to the actual running speed. In the exceptional speed control, the target running speed determined by the operation amount of the right and left steering levers 15a and 15b and the actual running speed (exceptional speed) are different. Therefore, in order to make the driver aware of the difference, the running control is transferred to the driver, i.e., the right and left steering levers 15a and 15b by returning the right and left steering levers 15a and 15b to a position corresponding to the exceptional speed which is the actual running speed in the exceptional speed control which has been performed once.

Figure 6:
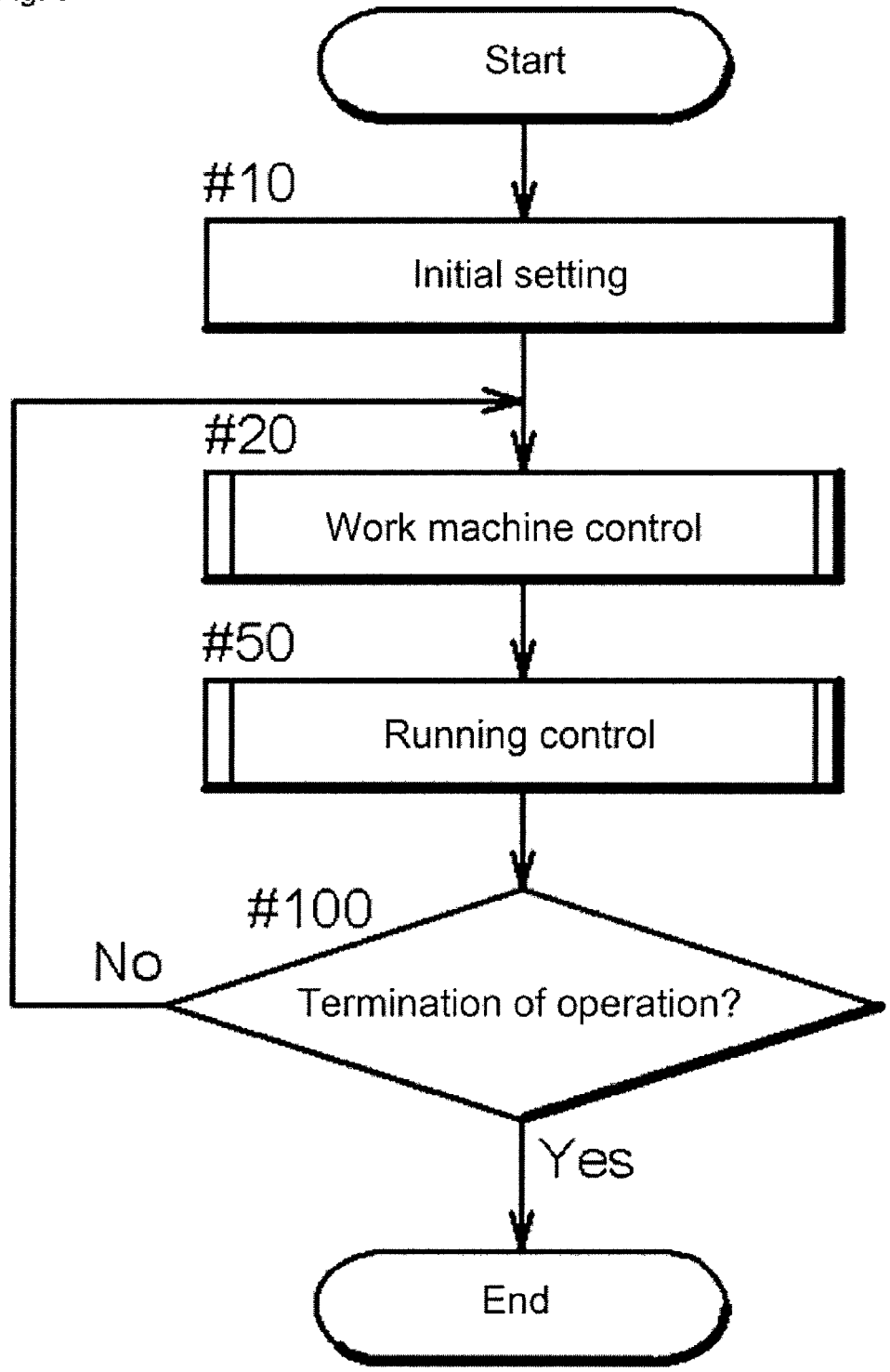
FIG. 6 is a flow chart showing the entire flow of control at the time of mowing work.
Figure 7:
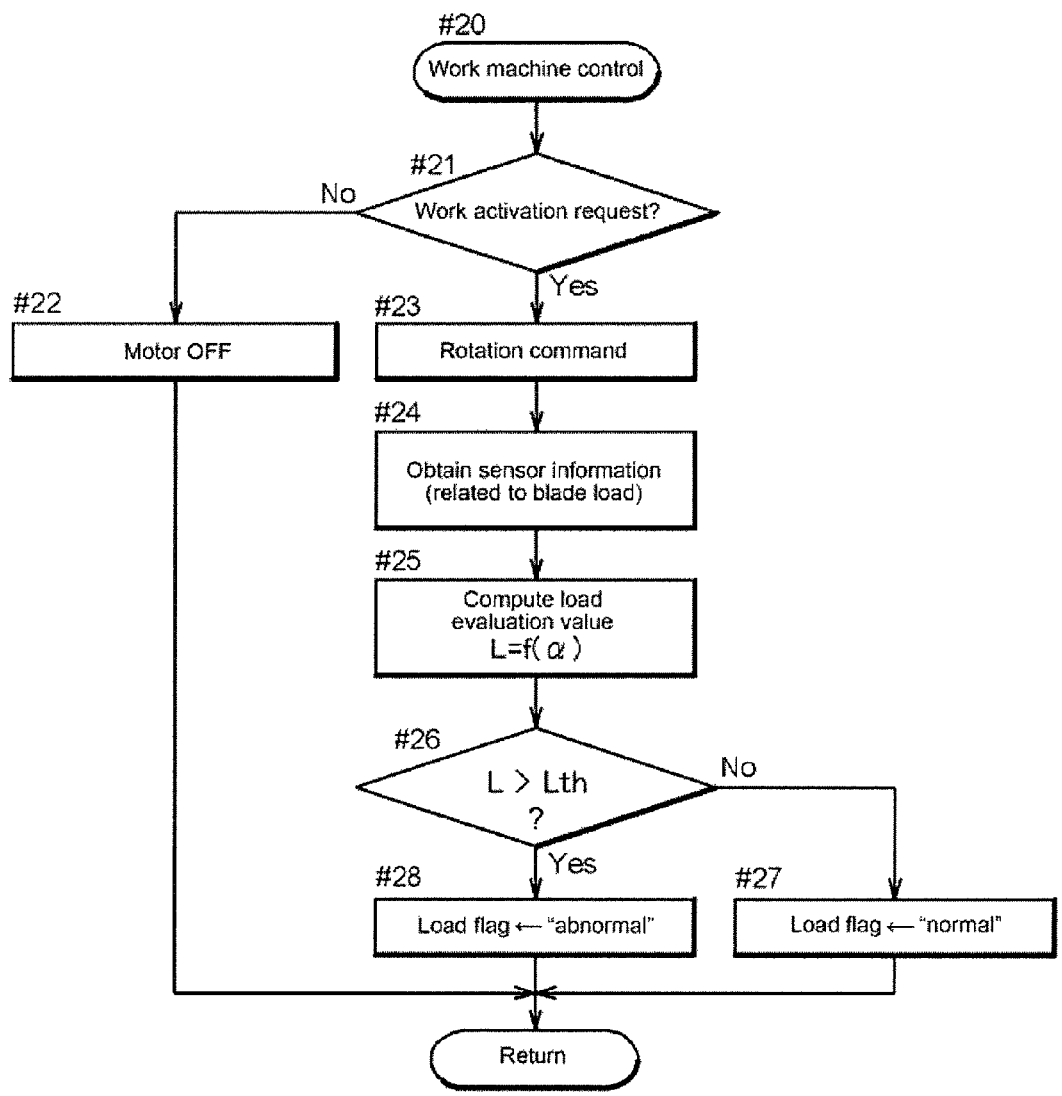
FIG. 7 is a flow chart showing the general flow of controlling a work machine.

The flow of the control in the mowing work by the riding electric mower configured above will be explained with reference to FIG. 6, FIG. 7, and FIG. 8. When the key of the riding electric mower is turned on and thereby the controller 5 is activated, initial setting processing such as initialization of a flag, a timer, and the like, or setting of a default value is performed (#10). Next, work machine control (#20) to control the mower unit 3 and running control (#50) are performed until termination of the operation (#100, Yes-branch). Here, for convenience, it is described that the work machine control and the running control is sequentially performed. Generally, however, these are performed in parallel.

In the work machine control (#20), first, whether an activation request (work activation request) of the work machine, i.e., an activation request to the mower unit 3 is input or not is checked (#21). This check is performed by determining the condition of a mower ON/OFF switch provided in the electric operating panel 18, for example. When the blade motors 31, 32, and 33 are in operation in a case where there is no activation request to the mower unit 3 (#21, No-branch), a command to stop the operation is issued (#22) and the processing is ended.

In a case where there is an activation request to the mower unit 3 (#21, Yes-branch), a rotation command to the blade motors 31, 32, and 33 is newly issued or a currently-input rotation command is repeated (#23). The operating load evaluator 56 obtains the rotation speeds of the blade motors 31, 32, and 33 or a value of the electric current flowing through the blade motors 31, 32, and 33, or both, as a control input parameter from the sensor information processor 51 (#24). The amount of mown grass may be used as the control input parameter. Next, the operating load evaluator 56 computes the load evaluation value L showing the load on the mower unit 3, i.e., the load on the blade motors 31, 32, and 33 from the obtained control input parameter (#25). The obtained load evaluation value L is compared with the threshold value "Lth" set by the threshold value setter 57 as described above (#26). The threshold value "Lth" is a judgment reference for judging whether the load on the mower unit 3, i.e., the blade motors 31, 32, and 33 is appropriate or abnormal load (high load).

In a case of L≤Lth (#26, No-branch), the load on the blade motors 31, 32, and 33 is considered to be appropriate, "normal" is set to a load flag (#27), and this routine is finished. In a case of L>Lth (#26, Yes-branch), the load on the blade motors 31, 32, and 33 is considered to be too high, "abnormal" is set to the load flag (#28), and this routine is finished. Setting "abnormal" to the load flag triggers exceptional control processing in running control as described below.

Figure 8:
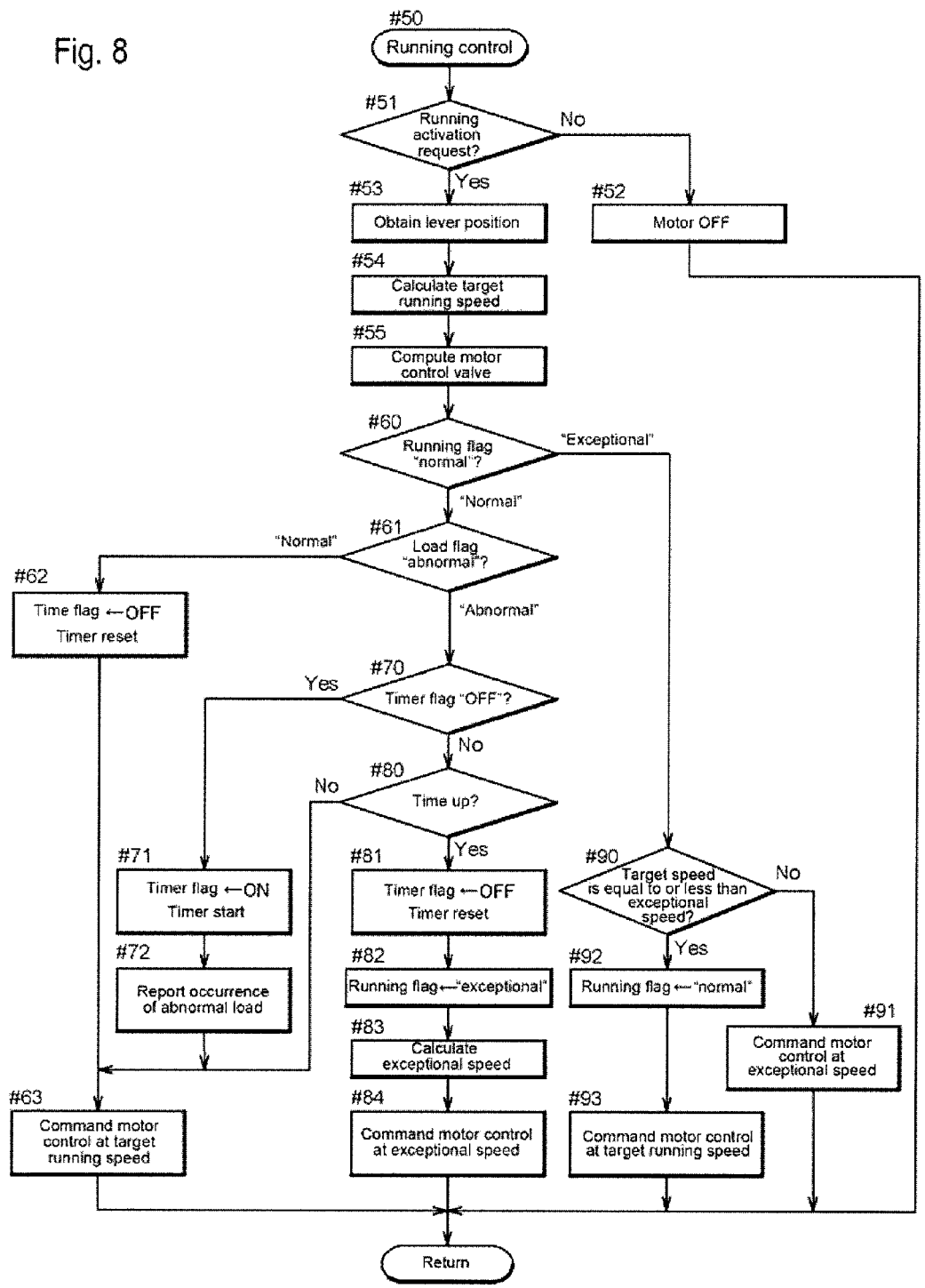
FIG. 8 is a flow chart showing the flow of running control.

As shown in FIG. 8, in the running control (#50), whether an activation request of running the vehicle (running activation request), i.e., an activation request to the left wheel motor 21 and the right wheel motor 22 is input or not is first checked (#51). When the left wheel motor 21 and the right wheel motor 22 are in operation in a case where there is no activation request to the left wheel motor 21 and the right wheel motor 22 (#51, No-branch), a command to stop the operation is issued (#52) and the processing is ended. In a case where there is an activation request to the left wheel motor 21 and the right wheel motor 22 (#51, Yes-branch), rotation control to the left wheel motor 21 and the right wheel motor 22 is performed. First, a sensor signal from the steering condition detection sensors 8 that detect the operation amount of the left steering lever 15a and the right steering lever 15b is processed in the sensor information processer 51, and information (internal signal) on the running speed corresponding to the operation amount of the left steering lever 15a and the right steering lever 15b is obtained (#53). The target running speed that is actually a target rotation speed of the left wheel motor 21 and the right wheel motor 22 is calculated from the information on the running speed (#54), and a motor control value to achieve the calculated target running speed (value to determine the power supply amount to the left wheel motor 21 and the right wheel motor 22) is computed (#55).

Next, whether the current running control is normal speed control or exceptional speed control is checked based on the content of a running flag (#60). When the content of the running flag is "normal", it is considered that normal speed control is performed, and the current load condition of the mower unit 3 is checked based on the above load flag (#61). When the content of the load flag is "normal", it is considered that the load is appropriate. In order to perform normal speed control, the motor control value obtained in step #55 is commanded, and running at the target running speed is performed (#63). However, considering that the check in step #61 is in a case of transition from "abnormal" to "normal" during an extension period to the exceptional speed control described below, a timer flag may be changed from "ON" to "OFF", and a timer reset may be performed (#62).

In step #61, when the content of the load flag is "abnormal", it is considered that the load is too high, and exceptional running processing is performed by reducing the running speed so as to reduce the load on the mower unit 3. In this embodiment, instead of immediately performing exceptional running processing, a driver is informed that the load of the mower unit 3 is too high, and encouraged to reduce the running speed. For this purpose, the timer flag is checked to control the extension period of performing the exceptional running processing (#70). When the content of the timer flag is "OFF", the extension period of the exceptional speed control has not started. Therefore, "ON" is set in the timer flag and the timer is started (#71). Next, a message to inform the occurrence of the abnormal load and to encourage reduction of the speed is given (#72). Since it is still in the extension period, in order to perform the normal speed control, the motor control value obtained in step #55 is commanded, and running at the target running speed is performed (#63).

In step #70, when the content of the timer flag is "ON", the extension period of the exceptional speed control has started. Therefore, whether the time is up or not in the timer is checked (#80). When the time is not up, it is still in the extension period. Therefore, in order to perform normal speed control, the motor control value obtained in step #55 is commanded, and running at the target running speed is performed (#63). When it is confirmed that the time is up in step #80, the exceptional speed controller 55 forcibly reduces the running speed to the exceptional speed. First, "ON" is changed to "OFF" in the timer flag, and the timer is reset (#81). "Normal" is changed to "exceptional" in the running flag (#82). Next, the exceptional speed is calculated (#83). In calculating the exceptional speed, it is possible to employ a method in which a predetermined value is read out or a method using dozens percent of the current rotation speed (rotation number per time) of the left wheel motor 21 and the right wheel motor 22. In a case where the exceptional speed control is performed while making a turn, it is necessary to assign the exceptional speed corresponding to the current speed ratio of the left wheel motor 21 and the right wheel motor 22 to each of the motors 21 and 22. In any case, when the exceptional speed is calculated, the motor control value computed to achieve the calculated exceptional speed is commanded, and the running at the exceptional speed is performed (#84).

When the exceptional speed control is started in this manner, "exceptional" is set in the running flag, and it is determined that the exceptional speed control is in operation by the check in step #60. In this embodiment, it is required for release from the exceptional speed control to return the left steering lever 15a and the right steering lever 15b to a position corresponding to the exceptional speed that is an actual running speed. First, therefore, whether the target running speed is equal to or less than the actual running speed (exceptional speed) is checked (#90). In this check, when the target running speed determined by the position of the left steering lever 15a and the right steering lever 15b is more than the exceptional speed (#90, No-branch), the motor control value corresponding to the calculated exceptional speed is commanded so as to continue the exceptional speed control (#91). In the check of step #90, when the target running speed determined by the position of the left steering lever 15a and the right steering lever 15b does not exceed the exceptional speed (#90, Yes-branch), "exceptional" is changed to "normal" in the running flag (#92) to move from the exceptional speed control to the normal speed control. The motor control value to achieve the target running speed determined by the position of the left steering lever 15a and the right steering lever 15b is computed, and commanded (#93).

In the flow of the control described above, the blade motors 31, 32, and 33 included in the mower unit 3 are treated as one motor to simplify the explanation. However, it may be possible to evaluate load on the mower unit 3 by setting a common or exclusive threshold value "Lth" with respect to each motor. In this instance, a different control method can be used as follows:

(a) When the number of the motors considered to have load lower than the common or exclusive threshold value "Lth" is in the majority, it is considered that the mower unit 3 has excessive load, and the control moves into the exceptional speed control.

(b) When there is at least one motor considered to have load equal to or more than the threshold value "Lth", the control moves into the exceptional speed control.

Alternative Embodiment (1) In the above-described embodiment, the threshold value "Lth" (excessive load level in the work machine unit) to move the normal running to the low-speed running at the exceptional speed is single. However, it may be possible to judge a plurality of load levels in a plurality of threshold values and set a different exceptional speed corresponding to the excessive load levels per excessive load level. Also, it may be possible to set the exceptional speed without any step corresponding to the excessive load levels equal to or more than the threshold value.

(2) In the above-described embodiment, the threshold value "Lth" that has been set once is used as a fixed value until a new one is obtained. However, it may be possible to use an active threshold value that varies within a predetermined range based on change in the work environment and the like.

(3) In the above-described embodiment, the threshold value "Lth" is set based on a predetermined algorithm. However, the threshold value "Lth" may be set/changed artificially by a threshold value setter provided in the electric operating panel 18 in the operation section, and the exceptional speed control may be performed by the artificially-set threshold value. The exceptional speed control may be performed only by a threshold value that has been set and stored in the controller 5 in advance.

(4) The above-described embodiment employs constant-speed control (on-off control) in which the rotation speed of the blade motors 31, 32 and 33 is not changed. However, the present invention covers a technique in which the rotation speed of the blade motors 31, 32 and 33 is changed corresponding to moving into exceptional speed control. For example, the rotation speed of the blade motors 31, 32 and 33 may be increased so as to improve the mowing performance as the running speed decreases corresponding to operation of exceptional speed control. In an opposite manner, the load on the mower unit 3 may be decreased further by reducing the rotation speed.

(5) The above-described embodiment employs a method in which detection of abnormal load is reported prior to moving into exceptional speed control by the detection of abnormal load and thereby the moving is delayed. However, it may be possible to move into exceptional speed control immediately without such delay. In the case of moving into exceptional speed control without such delay, it may be possible to report that the control moved into the exceptional speed control or the running speed was reduced. Alternatively, it is possible to move into the exceptional speed without reporting with delay or without delay by omitting the alarm 59.

(6) The above-described riding work vehicle is a full electric vehicle in which the driving wheel unit is performed by an electric motor. However, it may be possible to use a hybrid vehicle in which the driving wheel unit is driven by driving force of an installed engine (internal-combustion engine) or the battery is charged by driving an electric generator.

(7) The above-described embodiment is an example of a riding electric mower in which the work unit is the mower unit 3. The riding work vehicle to which the present invention can be applied includes a cultivator, a tractor, a rice planter, a combine, a civil engineering and construction machine, and a snow plow as well as a mower.

The present invention can be used for a riding work vehicle in which load on a working electric motor for driving a work device varies depending on change in the vehicle speed.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A riding work vehicle comprising:
a vehicle body having a driver seat;
a driving wheel unit supporting the vehicle body;
a running electric motor unit which runs and drives the driving wheel unit;
a speed setting operation unit operated by a driver to set a target running speed of the vehicle body;
a running controller which controls the running electric motor based on the target running speed;
a work unit having a work device that performs work on a worked object adjacent the vehicle body corresponding to running of the vehicle body, and at least one working electric motor that drives the work device;
a work controller controlling the working electric motor;
a work load evaluator that evaluates load of the at least one working electric motor; and
an exceptional speed controller that performs exceptional speed control to control the running electric motor unit at an exceptional speed lower than the target running speed in a case where the load of the at least one working electric motor evaluated by the work load evaluator is an abnormal load higher than a threshold value,
wherein the target running speed by the speed setting operation unit is canceled until the value of the target running speed by the speed setting operation unit becomes equal or less than the exceptional speed when the exceptional speed control is performed.

2. The riding work vehicle according to claim 1, wherein an alarm is provided to alert occurrence of the abnormal load to a driver, the target running speed is maintained, and, after a predetermined time period, the exceptional speed control is performed when the abnormal load is not solved even when the occurrence of the abnormal load is alerted by the alarm.

3. The riding work vehicle according to claim 1, wherein the threshold value is set based on a load evaluation value derived from a combination of the load on the worked object and one of the supply current value to the at least one working electric motor and the rotation number of the at least one working electric motor during running work of the electric motor.

4. The riding work vehicle according to claim 1, wherein the work unit is a mower unit and the worked object is lawn grass.

5. The riding work vehicle according to claim 4, wherein the at least one working electric motor comprises a plurality of working electric motors, and wherein the exceptional speed control is performed when at least one of the plurality of working electric motors has load equal to or more than the threshold value.

6. The riding work vehicle according to claim 4, wherein a rotational speed of the at least one working electric motor is changed in correspondence with a movement into the exceptional speed control.

7. The riding work vehicle according to claim 6, wherein the speed of the at least one working electric motor is increased so as to improve the mowing performance as the running speed decreases corresponding to operation of the exceptional speed control.

8. The riding work vehicle according to claim 6, wherein the speed of the at least one working electric motor is decreased as the running speed decreases corresponding to operation of the exceptional speed control.

9. The riding work vehicle according to claim 4, wherein:
the at least one working electric motor comprises a plurality of working electric motors,
a working electric motor of the plurality of working electric motors that is arranged closest to a discharge outlet has a rotation torque larger than respective rotation torques of the other working electric motors of the plurality of working electric motors, and
each working electric motor has a respective threshold value to evaluate a respective status of work load.

10. A riding work vehicle comprising:
a front wheel unit having a pair of right and left free rotating caster-type front wheels;
a rear wheel unit having a pair of right and left driving rear wheels;
a vehicle body supported by the front wheel unit and the rear wheel unit;
a running electric motor unit which runs and drives the rear wheel unit;
a speed setting operation unit comprising a left steering lever and a right steering lever operated by a driver to set a target running speed of the vehicle body;
a running controller which controls the running electric motor based on the target running speed;
a work unit having a work device that performs work on a worked object adjacent the vehicle body corresponding to running of the vehicle body, and a working electric motor that drives the work device;
a work controller controlling the working electric motor;
a work load evaluator that evaluates load of the working electric motor; and
an exceptional speed controller that performs exceptional speed control to control the running electric motor unit at an exceptional speed lower than the target running speed in a case where the load of the working electric motor evaluated by the work load evaluator is an abnormal load higher than a threshold value,
wherein when the exceptional speed control is performed, the target running speed by the speed setting operation unit is canceled until the value of the target running speed by the speed setting operation unit determined by the position of the left and right steering levers becomes equal or less than the exceptional speed.

* * * * *